United States Patent
Lehning et al.

(10) Patent No.: US 9,341,707 B2
(45) Date of Patent: May 17, 2016

(54) METHOD FOR CLASSIFYING MOVING VEHICLES

(71) Applicant: JENOPTIK Robot GmbH, Monheim (DE)

(72) Inventors: Michael Lehning, Hildesheim (DE); Dima Proefrock, Hildesheim (DE)

(73) Assignee: JENOPTIK ROBOT GmbH, Monheim (DE)

( * ) Notice: Subject to any disclaimer, the term of this patent is extended or adjusted under 35 U.S.C. 154(b) by 405 days.

(21) Appl. No.: 13/945,035

(22) Filed: Jul. 18, 2013

(65) Prior Publication Data

US 2014/0049420 A1 Feb. 20, 2014

(30) Foreign Application Priority Data

Aug. 14, 2012 (DE) .......................... 10 2012 107 445

(51) Int. Cl.
| | |
|---|---|
| *G01S 13/08* | (2006.01) |
| *G01S 7/41* | (2006.01) |
| *G01S 13/91* | (2006.01) |
| *G08G 1/015* | (2006.01) |
| *G01S 13/52* | (2006.01) |

(52) U.S. Cl.
CPC . *G01S 7/41* (2013.01); *G01S 13/52* (2013.01); *G01S 13/91* (2013.01); *G08G 1/015* (2013.01)

(58) Field of Classification Search
CPC ........... G01S 7/41; G01S 13/92; G01S 13/52; G01S 13/91; G08G 1/015; G08G 1/017; H03M 1/1038; H03M 1/12
USPC ............................ 342/109, 118; 341/118, 155
See application file for complete search history.

(56) References Cited

U.S. PATENT DOCUMENTS

| | | | |
|---|---|---|---|
| 4,985,705 A | | 1/1991 | Stammler |
| 6,140,954 A | * | 10/2000 | Sugawara ............. G01S 13/345 |
| | | | 342/128 |

(Continued)

FOREIGN PATENT DOCUMENTS

| | | |
|---|---|---|
| DE | 38 10 357 A1 | 10/1989 |
| DE | 38 10357 A1 | 10/1989 |

(Continued)

OTHER PUBLICATIONS

Fang, et al.; "A Low-cost Vehicle Detection and Classification System based on Unmodulated Continuous-wave Radar";Intelligent Transportation Systems Conference 2007;p. 715-720.

(Continued)

*Primary Examiner* — Timothy A Brainard
(74) *Attorney, Agent, or Firm* — Duane Morris LLP

(57) ABSTRACT

A method for classifying vehicles in which an angle-resolving radar device yields measurement signals which have frequencies corresponding to a Doppler shift and which originate from measured vehicles and from which radial distances, object angles and radial velocities can be derived. The frequencies of the acquired measurement signals are stored as functions over the measurement time period, and a spectrogram is formed for every vehicle therefrom. Subsequently, the spectrograms are checked for assessment regions with maximum bandwidth of the frequency. These assessment regions are compared with assessment regions of stored spectrograms for different vehicle classes and associated with the most similar such that the measured vehicles are classified.

8 Claims, 4 Drawing Sheets

(56) References Cited

U.S. PATENT DOCUMENTS 7,548,186 B2 6/2009 Mende et al.
2008/0278366 A1 11/2008 Behrens

FOREIGN PATENT DOCUMENTS

| | | | |
|---|---|---|---|
| DE | 10 2004 040 015 B4 | 12/2006 | |
| EP | 1 990 654 A1 | 11/2008 | |
| EP | 2 011 103 B1 | 3/2011 | |

OTHER PUBLICATIONS

Fang, J.X., et al.; "A Ground Vehicle Classification Approach Using Unmodulated Continuous-Wave Radar"; IET International Conference on Radar Systems 2007; pp. 1-4.

\* cited by examiner ced and faster vehicles (passenger cars) is particularly important in the context of automated monitoring and control of road traffic. According to the class of vehicle detected, for example, different tolls can be charged, traffic light installations can be controlled, or traffic violations can be penalized based on vehicle classes.

METHOD FOR CLASSIFYING MOVING VEHICLES

RELATED APPLICATIONS

The present application which claims priority benefit of German Application No. DE 10 2012 107 445.3 filed on Aug. 14, 2012, the contents of which are incorporated by reference in its entirety.

FIELD OF THE INVENTION

The invention is directed to a method for classifying vehicles as is generally known from Patent Document EP 2 011 103 B1.

The classification of vehicles in moving traffic has a wide spectrum of applications. Automated rough classification for differentiating large, slower vehicles (trucks, busses) from smaller, faster vehicles (passenger cars) is particularly important in the context of automated monitoring and control of road traffic. According to the class of vehicle detected, for example, different tolls can be charged, traffic light installations can be controlled, or traffic violations can be penalized based on vehicle classes.

BACKGROUND OF THE INVENTION

In the methods for rough classification of vehicles known from the prior art, vehicles are often classed by determining individual vehicle length based on the entry and exit of a vehicle into and from the measuring zone of a measuring arrangement. A feature of vehicle length which can be evaluated and which allows the vehicle to be assigned to the class of busses and trucks or to the class of passenger cars can be generated from the received signals with sufficient certainty by means of evaluation methods. Known arrangements of this kind work either with induction loops, which perform the classification based on the length and ground clearance of the vehicle determined when the vehicle drives through, or with radar devices which perform the classification based on the passage of the vehicle through the cone of the radar beam (radar cone) by means of a vehicle length that is determined from the duration of passage and the speed.

In a method disclosed in Laid Open Application EP 1 990 654 A1, the vehicle length is determined by means of a radar device which is installed at an acute angle at the side of the roadway. Based on distance points which are determined from the entry and exit of the vehicle and on the known installation angle, the length of the stretch of road traveled by the vehicle through the radar cone can be determined. The total distance covered by the vehicle within this time can be determined from the detected vehicle speed and transit time. Accordingly, the vehicle length can be calculated from the difference between the total distance and the transit distance, and the detected vehicle can be classified by comparison with the vehicle lengths typical of a class. Error effects resulting from one vehicle being concealed by another cannot be remedied with this method.

In a method described in Laid Open Application DE 38 10 357 A1, classification is likewise carried out based on the detected vehicle length. For this purpose, a Doppler echo is initially received during passage of a vehicle through the radar cone of a radar device, and the frequency is determined with maximum amplitude from the frequency spectrum of this Doppler echo. A speed is determined based on this frequency. The vehicle length can then be determined from the speed and the signal duration of the Doppler echo. The measurement of vehicle length by signal duration entails a number of error influences. Due to the fact that the radar beam is reflected by a surface whose size depends on the length of the vehicle, the signal duration is detected in such a way that it is distorted by the vehicle length in principle. Further, the radar beam which is directed obliquely on the vehicles causes shadowing on parts of the vehicles which results in a distorted length measurement. To increase the accuracy of length measurement, a correction factor which is determined separately and empirically for each influencing variable is used. Finally, the classification is carried out by comparing the corrected time curve of the Doppler echo with that of stored, identified models. However, the determined vehicle length is ultimately only a very rough estimation which can easily lead to erroneous classifications.

A hypothetical possibility for classifying vehicles without direct detection of vehicle length is described in Patent Document EP 2 011 103 B1. A radar beam is aligned along a traffic route by a radar device. A linear frequency modulated CW radar device is used allowing speeds and distances of traffic participants to be determined. The signals reflected by the traffic participants are separated from noise and evaluated in a data processing device. As a result of this processing, two Fourier transformation coefficients are generated; one coefficient is a function of the distance of the detected traffic participants and the other coefficient is a function of the speed of the detected traffic participants. When the two functions are plotted versus one another in the two dimensions of a Cartesian graph, characteristic patterns emerge for the different traffic participants. The composition and shape of these patterns is a measurement of the spread of the speeds and distances of the reflected signals of a traffic participant, the statistical evaluation of which allows traffic participants to be assigned to predefined classes. However, because of the measuring principle employed in the linear frequency modulated CW radar device, no angles can be associated with acquired objects. Therefore, while it is possible to ascertain the presence, e.g., of a passenger car or a truck in the radar cone, this assertion cannot be assigned with certainty insofar as there is more than one traffic participant located within the radar cone at the same time.

Another solution (Fang et al., 2007, IET International Conference on Radar Systems, 1-4) takes into account that radar radiation is reflected, in practice, at a number of locations on a vehicle leading to corresponding scattering of a received radar signal. These scattered signals are detected as Doppler frequencies of the reflecting vehicle positions over time. In so doing, a bundle of Doppler frequency curves is obtained which can be associated with spatial coordinates using the Hough transform. By means of these spatial coordinates and their relative relationships with respect to one another, the respective measured vehicle can be assigned to a particular size class with high reliability.

OBJECTS OF THE INVENTION

It is an object of the invention to find a method suitable for simultaneously and reliably classifying a plurality of vehicles passing through a radar cone.

In a method for classifying vehicles in which vehicles are measured while passing through a radar cone formed by radar radiation in that the surfaces of the vehicles on which radar radiation impinges reflect the radar radiation, and measurement signals with frequencies corresponding to the Doppler shift are generated, the above-stated object is met through the following method steps.

An angle-resolving radar device yielding measurement signals which have frequencies corresponding to the Doppler shift and from which radial distances, object angles and radial velocities can be derived is arranged at an installation height relative to the surface of a roadway and at a horizontal acute installation angle relative to an edge of the roadway.

This radar device emits a radar beam forming a radar cone, and measurement signals coming from at least one vehicle which passes through the radar cone and is accordingly measured are acquired at a plurality of measuring times during a measurement time period.

The frequencies of the acquired measurement signals of the measured vehicles are stored as functions over the measurement time period, and a spectrogram is formed therefrom for every vehicle.

Subsequently, the spectrograms are checked for assessment regions with maximum bandwidth of the frequency, and these assessment regions are compared with assessment regions of predetermined, stored spectrograms for different vehicle classes. The measured vehicles are then assigned to the respective vehicle class corresponding to the predetermined, stored spectrogram coming closest to the formed spectrogram. In so doing, the comparison can be limited in such a way that the maximum bandwidths of the formed spectrograms are compared with the maximum bandwidths of the predetermined, stored spectrograms. At least one measuring time is determined in the assessment region as an assessment time.

Object angles are derived in each instance from the measurement signals at at least one of the assessment times within the assessment regions with maximum bandwidth and are stored for the respective assessment time in each instance as a function over the frequency, and the curve of the function is compared with comparison models stored for different vehicle classes in order to verify the classification of the vehicles.

Alternatively, radial distances are derived in each instance from the measurement signals at at least one of the assessment times within the assessment regions with maximum bandwidth and are stored for the respective assessment time in each instance as function over the frequency, and the curve of the functions is compared with comparison models stored for different vehicle classes in order to verify the classification of the vehicles.

Signal amplitudes of the measurement signals for the respective assessment region from the measurement signals at at least one of the assessment times within the assessment regions with maximum bandwidth are stored in each instance as function over the frequency, and the curve of the functions is compared with comparison models stored for different vehicle classes in order to verify the classification of the vehicles.

A modeling of the vehicle size results from the comparison of all formed functions with stored comparison models.

It is advantageous when forming each function to determine a probability distribution for different vehicle sizes and to accumulate these probabilities in a weighted manner over the entire time period.

BRIEF DESCRIPTION OF THE DRAWINGS

The invention will be described in more detail in the following with reference to embodiment examples. The accompanying drawings show.

DESCRIPTION OF THE EMBODIMENTS

Figure 1:
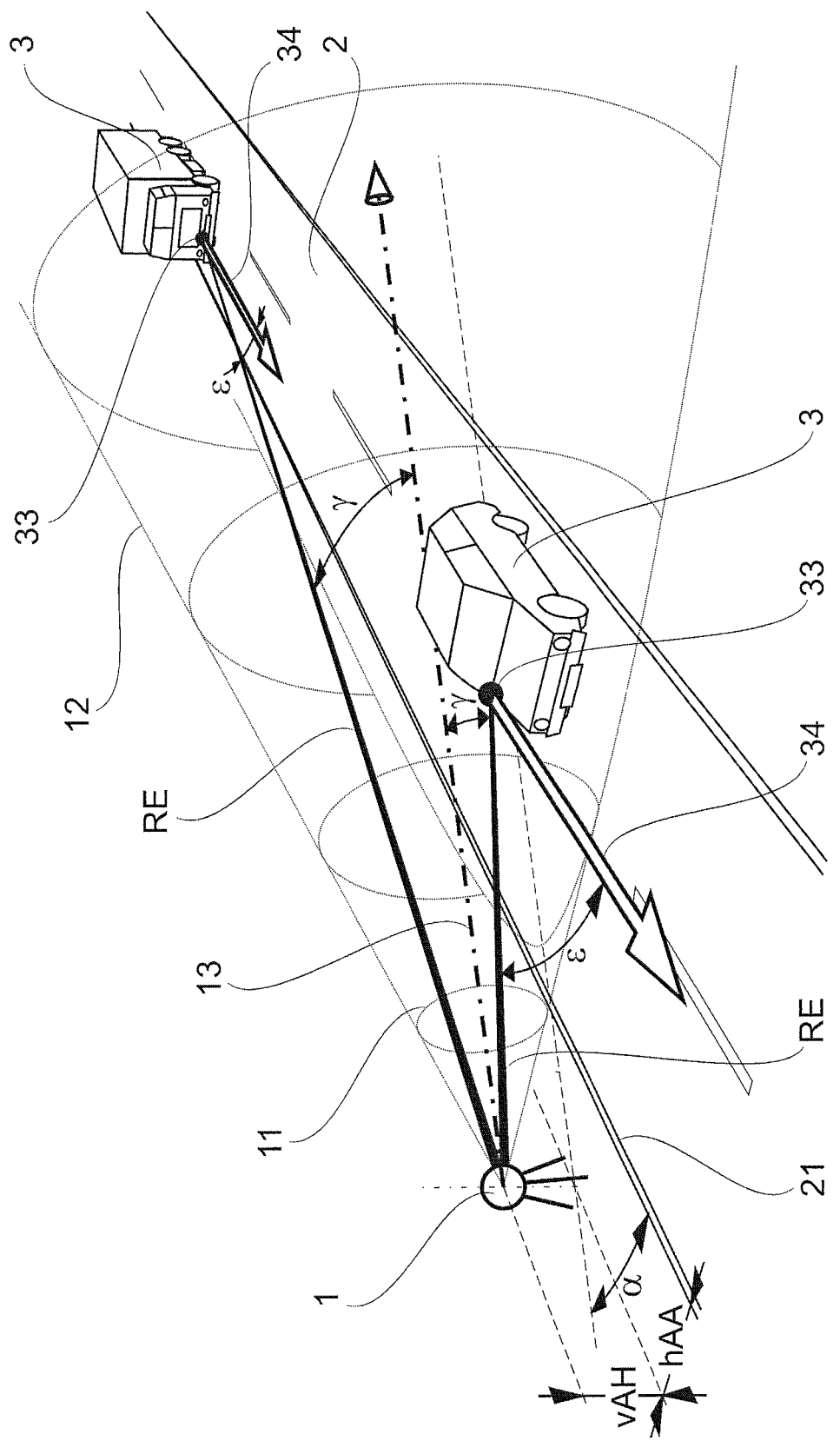
FIG. 1 is a schematic depiction of an arrangement of the radar device next to the roadway.

A FSK radar device, a special type of FMCW radar known from the prior art, is used as an angle-resolving radar device 1 for the method for classifying a vehicle 3, or also for simultaneous classification of a plurality of vehicles 3, traveling on a roadway 2. A plurality of vehicles 3 can be simultaneously acquired and also tracked by the FSK radar device 1. A FSK radar 1 (FSK=Frequency Shift Keying) emits radar radiation 11 on at least two alternating carrier frequencies and receives reflections of the at least two alternating carrier frequencies caused by acquired vehicles 3. A spatial resolution between a plurality of vehicles 3 corresponding to the radial distances RE, radial velocities and object angles thereof relative to the radar device 1 is possible within a short period of time through evaluation of frequency shifts between and within the two carrier frequencies reflected by the vehicles 3.

Various methods and arrangements suitable for these methods for deriving the above-mentioned parameters from the radar signals are known from the prior art, e.g., the flat antenna with two separate reception surfaces described in DE 10 2004 040 015 B4.

Depending on the radiation characteristics of the radar device 1, the radar radiation 11 forms an expanding radar cone 12 proceeding from the radar device 1 with an axis of symmetry 13 as is shown in FIG. 1. The orientation of the radar device 1 and, therefore, of the radar cone 12 with respect to the roadway 2 can be described and adjusted based on the orientation of the axis of symmetry 13. The radar cone 12 is directed to the roadway 2 in such a way that radar radiation 11 impinges on the vehicles 3 at a location distant from the radar device 1 (virtually frontally) to a location near the radar device 1 (virtually laterally). The vehicle 3 enters the radar cone 12 at the distant location and exits the radar cone 12 at the near location.

The radar radiation 11 emitted by the radar device 1 is reflected at the surfaces of the vehicles 3 on which the radar radiation 11 impinges and which reflect the radar radiation 11, and the reflected radar radiation 11 is acquired again by the radar device 1. The vehicles 3 are measured based on the emitted and reflected radar radiation 11. Owing to a relative movement of the vehicles 3 traveling through the radar cone 12 with respect to the radar device 1, these vehicles 3 generate Doppler shifts in the reflected radar radiation 11. From these Doppler shifts, the radar device 1 generates low-frequency measurement signals 4 which correspond to the Doppler shifts and are acquired and evaluated in the form of Doppler frequencies $f_D$. The evaluation of the measurement signals 4 by means of the method according to the invention allows vehicles 3 to be classified.

In order to carry out the method, the radar device 1 is arranged relative to the roadway 2 in a first method step in such a way that a radial velocity, a radial distance RE and an object angle γ of vehicles 3 moving toward the radar device 1 can be received. To this end, the radar device 1 is arranged next to the roadway 2 such that the axis of symmetry 13 forms a horizontal acute installation angle a with an edge 21 of the roadway 2. Further, the radar device 1 is installed in proximity to the ground (e.g., at the typical height of the wheel axles of vehicles 3) at a known vertical installation height vAH and at a vertical installation angle (not shown) of the axis of symmetry 13 with respect to the surface of the roadway 2, usually 0°, so that the axis of symmetry 13 is aligned parallel to the roadway 2.

In an embodiment of the method, it is also possible to arrange the radar device 1 directly above the roadway 2, e.g., at the height of a bridge passing over the roadway 2. In this case, the axis of symmetry 13 is oriented parallel to the roadway edge 21 and at a vertical installation angle with respect to the surface of the roadway 2. Accordingly, the vehicles 3 are acquired virtually from the front at the location which is substantially distant from the radar device 1 and virtually from above at the location located near the radar device 1.

The measurement signals 4 captured by the radar device 1 are emitted in the form of Doppler frequencies $f_D$. The radial velocities of the measured vehicles 3 are determined directly from the Doppler frequencies $f_D$.

For purposes of a simplified clarification of terms, the vehicle 3 as is shown in FIG. 1 is reduced to the reflection signal of an ideal point reflector 33 and the radar device 1 is considered a point source of the radar radiation 11 from which the axis of symmetry 13 of the radar cone 12 also proceeds. The person skilled in the art knows that the axis of symmetry 13 is the transmission axis of the radar device 1 which extends parallel to an axis of the receiver unit to which the object angles γ relate. The distance between these axes need not be taken into account, however, so that the axis of symmetry 13 may be viewed as an axis of the radar device 1 to which readings with respect to the radar cone 12 as well as object angles γ can be related.

Therefore, the radial distance RE of the vehicle 3 corresponds to the direct distance of the point reflector 33 from the point source. It is derived directly from a frequency shift measurement between the two carrier frequencies of the FSK radar 1.

Therefore, the radial velocity of the vehicle 3 is the speed at which the point reflector 33 moves in radial direction toward the point source. The radial velocity is only one speed component of a real vehicle speed at which the vehicle 3 moves in a traveling direction 34 on the roadway 2. Due to the fact that the radar device 1 is installed laterally next to the roadway 2, the driving direction 34 of the vehicle 3 is directed past the radar device 1. When considered vectorially, the vehicle speed can be determined by the sum of a speed component oriented radial to the radar device 1 (radial velocity) and a speed component oriented at right angles thereto (tangential speed). The radial velocity is derived directly from the Doppler frequency $f_D$ of the radar radiation 11 reflected by the point reflector 33.

Object angle γ refers to the angle formed at the point source of the radar radiation 11 between the axis of symmetry 13 and a straight line to the point reflector 33. The object angle γ is determined based on two different phase shifts of the radar radiation 11 radiated by the one transmitter surface, which phase shifts are measured at the two receiver surfaces according to the principle of triangulation.

In contrast to the ideal point reflector 33, a vehicle 3 has a spatial extent with a plurality of spatially distributed surfaces which reflect the radar radiation 11 and which in turn form a plurality of detectable point reflectors 33. Consequently, the measurement signal 4 received for a detected vehicle 3 also has a plurality of Doppler frequencies $f_D$. Depending on the radial distance RE, object angle γ and vehicle angle ε of the vehicle 3, a plurality of spatially distributed reflections of the radar radiation 11 are also detected at the vehicles 3. The quantity and distribution of the reflections at the vehicles 3 increases as the radial distance RE decreases because the magnitudes of the reflecting surfaces of the vehicle 3 also increase from the perspective of the radar device 1. The radial distance RE, radial velocity and object angle γ can be derived for each of the individual acquired reflections so as to be differentiated according to the spatial arrangement thereof at the surfaces of the vehicle 3.

In a second method step, the radar radiation 11 forming the radar cone 12 is emitted by the radar device 1. When at least one vehicle 3 passes through the radar cone 12, the radar radiation 11 is partially reflected at the reflecting surfaces of the vehicle 3 and the reflections are acquired by radar device 1 as measurement signals 4 with a corresponding signal amplitude SA. The measurement signals 4 are acquired within a measurement time period t at a plurality of measuring times.

In order to produce a sufficient signal-to-noise ratio with respect to ambient noise in the measurement signals 4 which is acquired at the same time on principle and in order to improve unambiguity in the detection of the measurement signals 4, it is useful to determine a threshold value for the signal amplitudes SA that must be exceeded by the signal amplitudes SA of the detected measurement signals 4 in order to be included in a subsequent signal processing.

In a third method step, the measurement signals 4 are stored temporarily in the form of Doppler frequencies $f_D$ associated with the measuring times. They can be plotted over the measurement time period t on a time axis. All of the acquired measurement signals 4 of a measured vehicle 3 can be represented as a spectrogram in the form of a time curve of the Doppler frequencies $f_D$.

Figure 2:
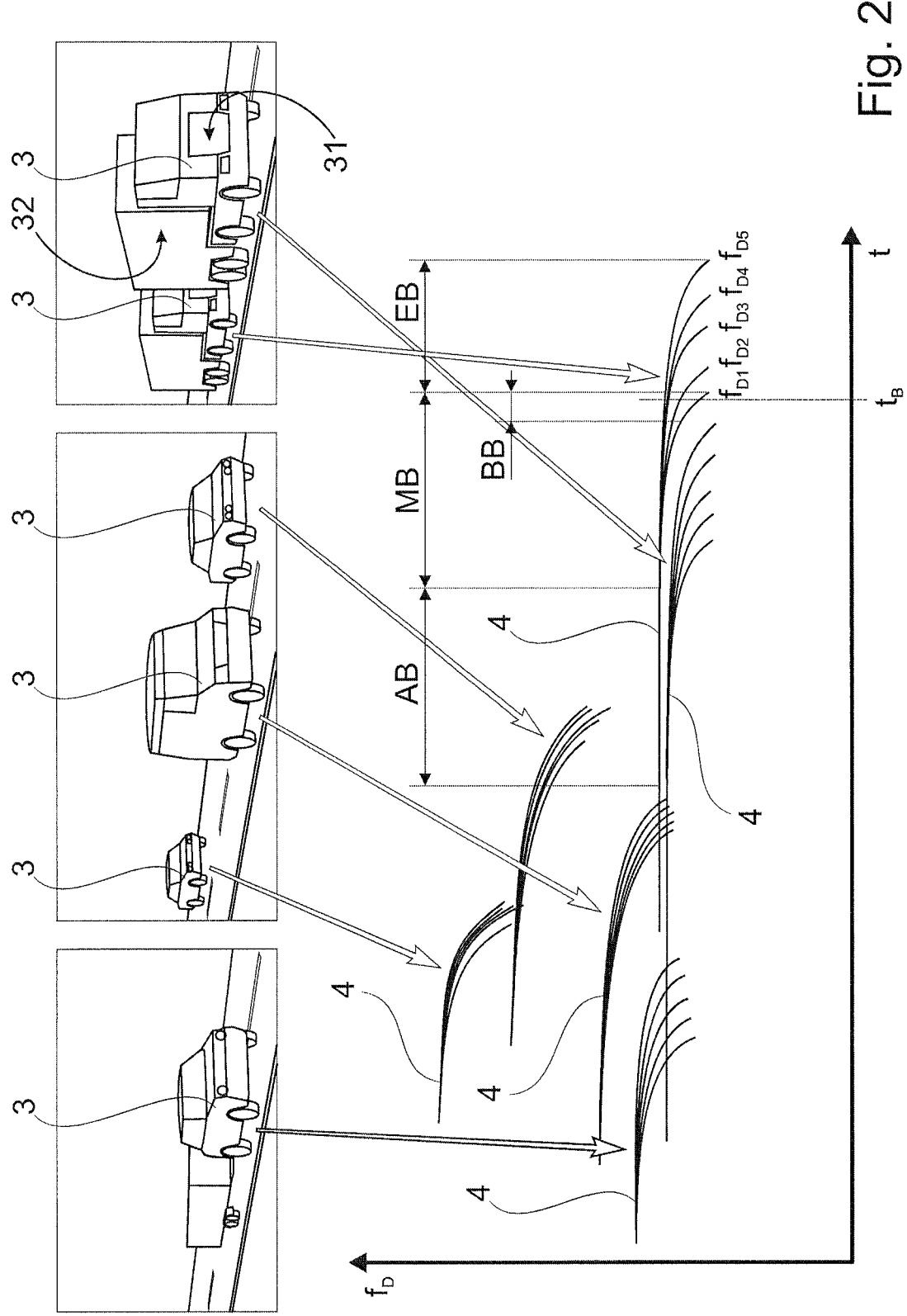
FIG. 2 is spectrograms of a plurality of vehicles measured in a measurement period.

FIG. 2 shows spectrograms formed from measurement signals 4 of different vehicles 3. It will be seen that the spectrograms have characteristic shapes which can be associated directly with the measured vehicles 3 and differentiated into determined signal regions depending on the size of the vehicles 3. Further, the measurement signals 4 in the spectrogram have different positions. Due to the fact that the measured Doppler frequencies $f_D$ are proportional to the radial velocity of the vehicle 3, the measurement signals 4 of faster vehicles 3 are arranged at higher values on the frequency axis than the measurement signals 4 of slower vehicles 3. However, this difference cannot yet be utilized to classify the vehicles 3 because, in theory, every vehicle 3 could also move at any vehicle speed.

The shape of the vehicle 3 acquired at the latest measuring time (spectrogram on the right-hand side of FIG. 2) will be described by way of example.

The acquisition of measurement signals 4 commences when the vehicle 3 enters the radar cone 12. Entry takes place at the location remote of the radar device 1 so that the vehicle 3 is acquired virtually frontally by the radar radiation 11. Therefore, the radar radiation 11 is reflected substantially at the surfaces of a vehicle front 31 which is still very small from the perspective of the radar device 1. Accordingly, the Doppler frequencies $f_D$ acquired by this reflected radar radiation 11 have a small, as yet undifferentiated spectral distribution, and the measurement signals accordingly resemble the measurement signals 4 of the ideal point reflector 33. Therefore, for early measuring times the depiction of the measurement signals 4 in the spectrogram shows a starting region AB with a very small spectral distribution. Due to the fact that the tangential speed at the location remote of the radar device 1 is still very low, the radial velocity corresponds approximately to the vehicle speed. Assuming that the vehicle 3 moves along the roadway 2 at a constant vehicle speed while traveling through the radar cone 12, the measurement signals 4 in the spectrogram remain virtually constant without a significant change in the Doppler frequencies $f_D$.

Because the driving direction 34 of the vehicle 3 is directed past the radar device 1, as the radial distance RE of the vehicle 3 from the radar device 1 decreases, the radial velocity likewise decreases owing to the increasing tangential speed. Therefore, in a middle region MB, the measurement signals 4 initially curve slightly in the direction of lower Doppler frequencies $f_D$ with a continuously increasing drop-off. As radial distance RE decreases, the reflecting surface of the vehicle 3 increases from the perspective of the radar device 1. Further, as radial distance RE decreases, the vehicle 3 has a different object angle γ with respect to the axis of symmetry 13 so that, in addition to the vehicle front 31, surfaces of a vehicle flank 32 also increasingly contribute to the reflection of radar radiation 11 and, therefore, to the generation of Doppler frequencies $f_D$. Accordingly, the radar device 1 can detect a larger number of reflections with a larger spatial scattering on the surfaces of the vehicle 3 than at earlier measuring times. The Doppler frequencies $f_D$ which are generated at the different surfaces of the spatially extended vehicle 3 have different radial velocities depending on their radial distance RE from the radar device 1. These differences in radial velocity and in the measured Doppler frequencies $f_D$, which are very slight but can be resolved by the FSK radar device 1, manifest themselves in the spectrogram as a broadening of the spectral distribution of Doppler frequencies $f_D$ which continuously increases as the radial distance RE from the radar device 1 decreases. At the end of the passage through the radar cone 12, the vehicle is located close to the radar device 1. Therefore, the object angle γ is proportionately large so that the surfaces of the flank 32 of the vehicle 3 are mostly detected by the radar radiation 11. Because of the length of the vehicle 3, a maximum spatial scattering of the reflections proceeding from the vehicle front 31 and vehicle flank 32 is achieved in this position. Due to the highly differentiated spatial scattering, the differences in the radial velocities or measured Doppler frequencies $f_D$ are also at a maximum. Therefore, the measurement signals 4 at the end of the middle region MB shortly before the vehicle 3 exits the radar cone 12 show a maximum possible spectral distribution in the spectrogram.

To show the increasing spectral distribution, five Doppler frequencies $f_{D1}$ to $f_{D5}$ are used by way of example in FIG. 2 to illustrate the multitude of reflections detected at the surface of the vehicle 3. The temporal sequence of measurement signals 4 starts with Doppler frequency $f_{D1}$, which is generated at a reflecting surface near the vehicle front 31, and ends with Doppler frequency $f_{D5}$ which is generated at a reflecting surface at the end of the vehicle flank 32. The other Doppler frequencies $f_{D2}$, $f_{D3}$ and $f_{D4}$ resulting at reflecting surfaces of vehicle 3 which are located between the vehicle front 31 and the end of the vehicle flank 32 are acquired between Doppler frequencies $f_{D1}$ and $f_{D5}$. At early measuring times, it can be assumed that Doppler frequencies $f_{D3}$ to $f_{D5}$ cannot yet be detected because they occur at the vehicle flank 32 which is not visible to the radar device 1 at these measuring times. For the measurement signals 4 actually acquired, there is also, aside from Doppler frequencies $f_{D2}$, $f_{D3}$ and $f_{D4}$, a number of other Doppler frequencies $f_D$ in the intermediate spaces between Doppler frequencies $f_{D1}$ to $f_{D5}$ which are not shown for the sake of simplicity.

Shortly before exiting the radar cone 12, the vehicle 3 moves along the roadway 2 past the radar device 1 so that the tangential speed increases very sharply and the radial velocity decreases very sharply. There is a maximum drop in radial velocity at this measuring time. As soon as the vehicle 3 exits the radar cone 12, reflections can no longer be detected. Therefore, the measurement signal 4 has an end region EB in which the recordings of different Doppler frequencies $f_{D1}$ to $f_{D5}$ end. Due to the length extension of the vehicle 3, the reflecting surfaces distributed over the length of the vehicle 3 exit successively in time from the radar cone 12 so that the measurement signals 4 are very spread out over time in the end region EB. The temporal spread is proportional to the length of the vehicle 3.

In a fourth method step, an assessment region BB of the measurement signals 4 is determined in the spectrogram in which the spectral distribution of Doppler frequencies $f_D$ has a maximum bandwidth. As will be seen from FIG. 2, the assessment region BB can generally be found at the end of the middle region MB of the sequence of measurement signals 4 shortly before the vehicle 3 begins to exit the radar cone 12. At least one measuring time in the assessment region BB is defined as an assessment time $t_B$ at which, in addition to all of the determined Doppler frequencies $f_D$, other signal components that can be derived from the measurement signals 4 are read out or determined. These other signal components include the signal amplitudes SA of the acquired Doppler frequencies $f_D$ and the radial distances RE and the object angles γ at the spatially distributed reflecting surfaces of the vehicle 3 at which the acquired Doppler frequencies $f_D$ are generated. The signal components are subsequently subjected to a detailed evaluation. The evaluation is carried out for each of the signal components in that the corresponding signal component is recorded and stored as function over the Doppler frequency $f_D$ in a respective frequency spectrum. Only portions of the frequency spectra containing the required information are used for evaluation. These portions were experimentally determined beforehand. The rest of the portions of the frequency spectra need not be considered further in the evaluation.

In principle, the detailed evaluation can also be carried out at earlier measuring times outside of the assessment region BB, although the unambiguity of the signal components and, therefore, the reliability of the evaluation are diminished due to the higher spectral density. At later measuring times outside of the assessment region BB, detailed evaluation is no longer possible because the vehicle 3 has already exited the radar cone 12 so that not all of the Doppler frequencies $f_D$ are still available for evaluation.

The detailed evaluation of the signal components is described with reference to the cases illustrated in FIGS. 3a to 3c.

Figure 3C:
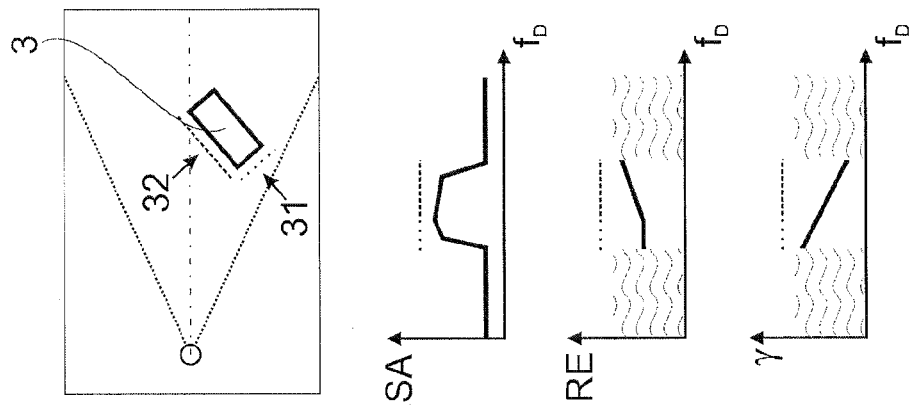
FIG. 3c is a basic derivation of the frequency spectra of the signal components from the measurement signals of a vehicle that is captured mainly from the side.
Figure 3B:
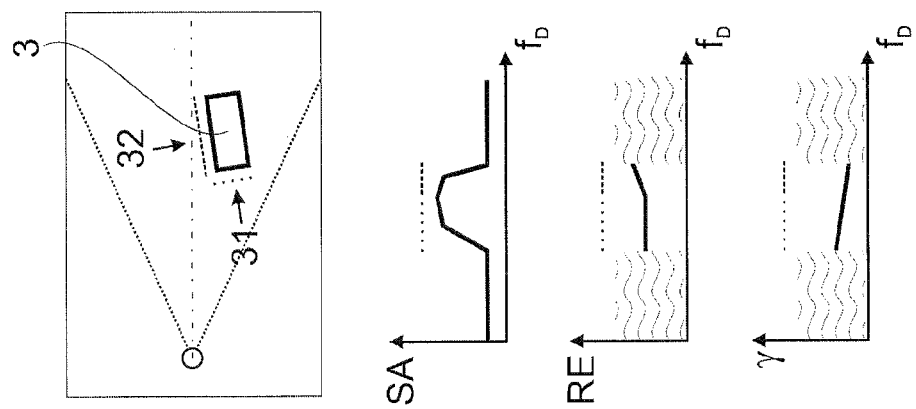
FIG. 3b is a basic derivation of the frequency spectra of the signal components from the measurement signals of a vehicle that is captured mainly from the front.
Figure 3A:
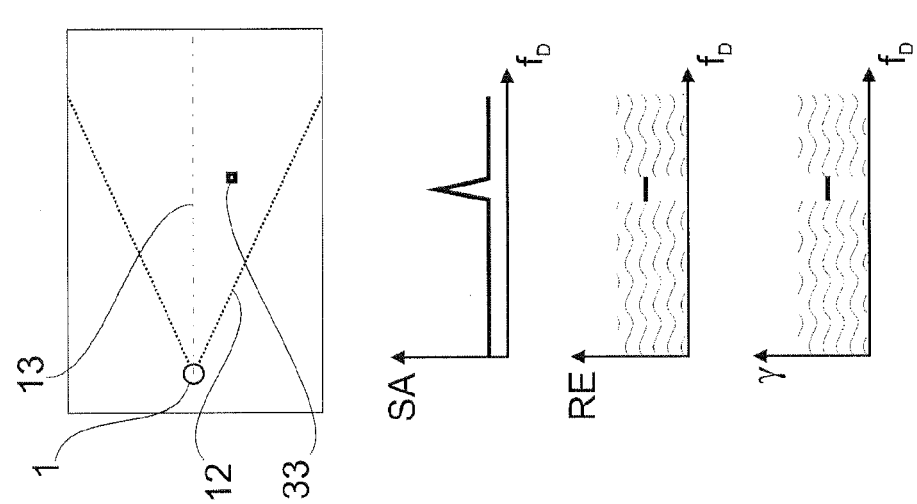
FIG. 3a is a basic derivation of the frequency spectra of the signal components from the measurement signals of a point reflector.

For better comprehension, FIG. 3a first shows the evaluation of the signal components of the ideal point reflector 33. The arrangement of the point reflector 33 relative to the radar device 1 is shown schematically in the top illustration. Due to the absence of spatial extension, the point reflector 33 has only one surface reflecting the radar radiation 11 at a single radial distance RE from the radar device 1 at assessment time $t_B$ (and also at all other measuring times with point reflector 33). Therefore, the point reflector 33 also generates only one Doppler frequency $f_D$ with a signal amplitude SA without spectral bandwidth. Further, only one radial distance RE and one object angle γ can also be determined. For this reason also, only one measured value is shown for a Doppler frequency $f_D$ in the frequency spectra of the radial distance RE and object angle γ.

FIGS. 3b and 3c show the evaluation of the signal components of vehicle 3. The schematic diagrams show the rectangular outline of vehicle 3 from above in a radar cone 12 at an at least approximately identical radial distance RE but different vehicle angles ϵ (shown only in FIG. 1) formed by the vehicle 3 with the respective longitudinal axis thereof identical to the driving direction with the direction of the radial distance to the radar device 1. The vehicle 3 is accordingly seen by the radar device 1 from different viewing angles. Such changes in the vehicle angle s result when the vehicle 3 passes through the radar cone 12.

FIG. 3b shows the signal components of vehicle 3 acquired at assessment time $t_B$, the longitudinal axis of the vehicle 3 being oriented at a flat vehicle angle E so that the radar radiation 11 is reflected substantially at the vehicle front 31 (indicated by a dotted line) and only a small proportion of the radar radiation 11 is reflected at the vehicle flank 32 (indicated by a dashed line). Due to the spatial extension, a plurality of spatially distributed reflecting surfaces (reflectors) contribute to forming the measurement signal 4 which, in contrast to the point reflector 33, lead to a spectral bandwidth in the frequency spectra of the signal components.

The frequency spectrum of the signal amplitudes SA, i.e., the function of the signal amplitudes SA over Doppler frequency $f_D$, shows two characteristic portions. In the portion of lower Doppler frequencies $f_D$, the frequency curve is characterized by a virtually linear rise of signal amplitudes SA. This rise can be assigned to the reflections generated at the vehicle front 31 because, in contrast to the radial velocities measured at the vehicle flank 32, the radial velocities measured at the vehicle front 31 are smaller due to the larger proportion of tangential speed. The maximum signal amplitudes SA are obtained at the corner of the vehicle 3 facing the radar device 1 and at the transitional areas thereof leading to the vehicle front 31 and vehicle flank 32. In this case, the proportion of surfaces oriented at right angles to the imaginary radial connecting line to the radar device 1 is especially high so that the radar radiation 11 is reflected particularly well. After the maximum, the signal amplitudes SA decrease again toward the higher Doppler frequencies $f_D$. The drop in the signal amplitude SA is produced by the reflectors which (in contrast to the vehicle corner) face the radar less directly. On the other hand, the higher radial velocity leads to the higher spectral bandwidth mentioned above.

The frequency spectrum of the radial distance RE, i.e., the function of radial distance RE over Doppler frequency $f_D$, likewise shows two characteristic portions. In the portion of lower Doppler frequencies $f_D$, the radial distance RE is virtually unchanged. This portion is formed by the reflections generated at the vehicle front 31. Since the vehicle front 31 is oriented virtually orthogonal to the imaginary radial connecting line to the radar device 1, no substantial differences in the radial distance RE occur at the vehicle front 31. In the transition from the vehicle front 31 to the vehicle flank 32, the radial distances RE increase corresponding to the length and the consequent changes in the object angle relative to the axis of symmetry 13 of the measured vehicle 3. Therefore, in the portion of higher Doppler frequencies $f_D$ the function rises. The frequency spectrum is narrower in the portion of the rise in radial distance RE because the change in radial velocity is smaller due to the oblique angle. The signal strength (reflected radar radiation) has no effect on the width but only on the height.

The frequency spectrum of the object angle γ, i.e., the function of object angle γ over Doppler frequency $f_D$, is characterized by a linearly falling object angle γ. The decrease expresses the length and width of the vehicle 3 acquired by the radar device 1 from the perspective of the radar device 1 through the vehicle angle ϵ.

FIG. 3c again shows the signal components of vehicle 3. In contrast to the diagram in FIG. 3b, the longitudinal axis of vehicle 3 is oriented in this case at a steep vehicle angle s such that a greater proportion of radar radiation 11 is reflected at the vehicle flank 32 (indicated by a dashed line) and a smaller proportion of radar radiation 11 is reflected at the vehicle front 31 (indicated by a dotted line).

If the proportions proceeding from the vehicle front 31 and vehicle flank 32 correspond to the reflecting surfaces contributing to the reflection of radar radiation 11, the division of characteristic portions into the frequency spectra of signal amplitude SA and radial distance RE also changes. For a similar signal curve, the proportion of the frequency spectrum received at the vehicle front 31 is now appreciably narrower than the proportion received at the vehicle flank 32.

In the frequency spectrum of the object angle γ, the frequency curve shows a significantly steeper rise of the object angle γ.

As is shown by the comparison of frequency spectra at different vehicle angles ϵ, the curve of the evaluated signal component is typical of a particular orientation and length of vehicle 3.

The classification of the measured vehicle 3 is carried out in a fifth method step. For this purpose, the frequency spectra determined for vehicle 3 are compared with frequency spectra which were determined and stored beforehand based on model vehicles, i.e., vehicles whose assigned class is known, and which are in the form of comparison models VM.

To allow a direct comparison, the comparison models VM were previously learned by a radar device 1 which was arranged with respect to the roadway 2 in exactly the same way as the radar device 1 is now installed for implementing the method, and the frequency spectra were derived from the measurement signals at a measuring time at which the comparison model VM was located at an identical radial distance RE. Therefore, the comparison models VM are already assigned to a vehicle class. When a match is determined between the measured vehicle 3 and one of the comparison models VM, the measured vehicle 3 can be assigned to the corresponding vehicle class. Thus the measured vehicle 3 is likewise classified.

Figure 4:
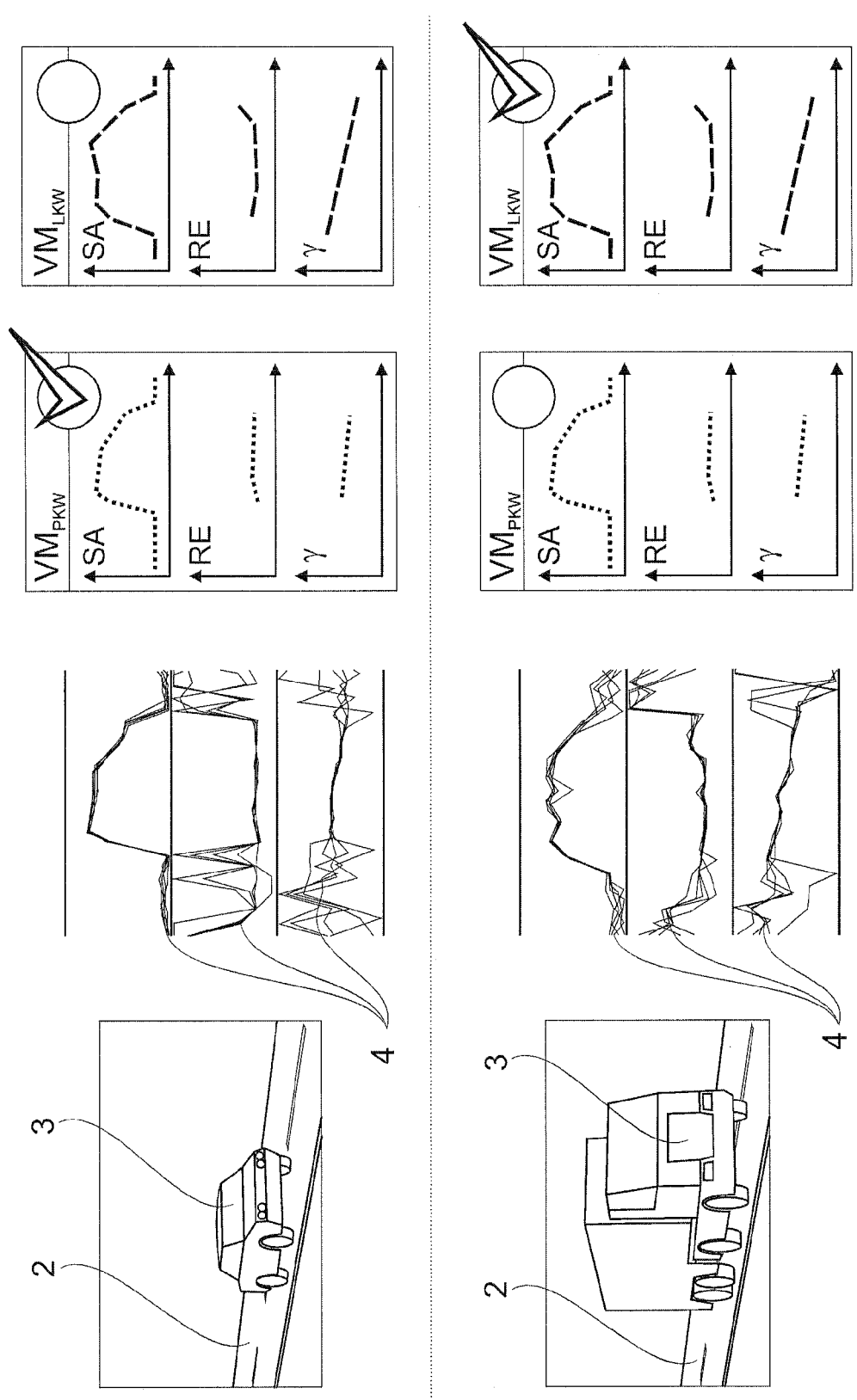
FIG. 4 is an example for classification of a passenger car and a truck based on classed comparison models.

FIG. 4 shows the classification of vehicles 3 of different lengths. The frequency spectra of the signal amplitudes SA, radial distances RE and object angle γ (shown in the second column in FIG. 4) which are derived from the measurement signals 4 as functions over the Doppler frequency $f_D$ are compared with the comparison models VM (shown in the third and fourth columns in FIG. 4). Two comparison models VM are used in FIG. 4: one for the vehicle class of passenger cars (dotted line) and one for the vehicle class of trucks (dashed line). A comparison of the frequency spectra determined for the vehicle 3 shown in the top half of FIG. 4 with the frequency spectra of the comparison models VM shows a maximum correspondence to the comparison model VM of the passenger car (third column). Therefore, this vehicle 3 can be classified as a passenger car. The frequency spectra determined for the vehicle 3 shown in the bottom half of FIG. 4 have a maximum correspondence to the comparison model VM of the truck (fourth column). Accordingly, this vehicle 3 can be classified as a truck.

The comparison models VM are preferably calculated during the process by means of a formula defined for each of the different vehicle classes and the actual parameters obtained from the installation of the radar device 1 and the measurement signals 4, namely the radial velocities, radial distances RE, vehicle angle ε and object angles γ.

With a stationary arrangement of the radar device 1 with respect to the roadway 2, the comparison models VM can also be generated from previously recorded curves of measurement signals 4. To this end, the length of the vehicles 3 is first determined in the previously recorded curves of measurement signals 4. The length of the vehicles 3 is determined at the end of the middle region MB of the curve of the measurement signals 4 from the bandwidth of the spectral distribution of the curve of the measurement signals 4 (e.g., at assessment time $t_B$); long vehicles 3 have a large bandwidth and short vehicles 3 have a small bandwidth.

It is also possible to determine the length of the vehicles 3 as a function of radial velocity from the period of time required for the vehicle 3 to move out of the radar cone 12. The period of time can be determined at the end of the curve of the measurement signals 4 from the width of the end region EB.

In accordance with the determined length of the vehicle 3, the previously received or simultaneously determined curves of the measurement signals 4 are sorted into different groups by giving consideration to probability. By (manually) assessing the vehicles 3 sorted into the groups, the groups and, therefore, the curves of measurement signals 4 or vehicles 3 sorted into these groups are assigned to a corresponding vehicle class.

In order to generate the comparison models VM, all of the classified curves of measurement signals 4 sorted into a group are weighted and accumulated over the entire time curve thereof The portion having the largest spectral bandwidth is determined in the accumulated curve of the measurement signals 4, and the derivable signal components (signal amplitude SA, radial distance RE, object angle γ) are determined therein at an assessment time $t_B$. The individual frequency spectra generated from the signal components now contain an average frequency spectrum corresponding to the vehicle class and can be used as comparison models VM. As regards the comparison models VM, it is sufficient to use only characteristic portions, e.g., rises or discontinuities in the frequency spectra, and to mask the rest of the portions as is shown in FIG. 3 in the frequency spectra of the radial distance RE and object angle γ.

Comparison models VM can also be obtained from a theoretical calculation. For this purpose, the installation conditions (horizontal installation distance hAA, horizontal installation angle α, vertical installation height vAH and vertical installation angle β) of the radar device 1 are detected as measurement signals 4 at an actual installation. Simplified true-to-scale vehicle models (e.g., the surfaces of a rectangle) are generated to represent the vehicles 3. Theoretical reflection responses can be calculated in accordance with the installation conditions and vehicle models, and the comparison models VM can be prepared from these theoretical reflection responses.

In principle, the method can also be applied without exact knowledge of the installation conditions of the radar device 1 with respect to the roadway 2 because exclusively the measurement signals 4 relating to the radar device 1 (Doppler frequency $f_D$, radial distance RE and object angle γ) are used in the method for classifying the vehicles 3. Therefore, the radar cone 12 can be oriented with respect to the roadway 2 with a certain tolerance range in which the required measurement signals 4 can still be detected with sufficient certainty. However, if the arrangement of the radar device 1 does not correspond to the installation conditions under which the comparison models VM were prepared, it is always necessary to prepare new comparison models VM corresponding to the actual installation conditions before applying the method.

Further, an arrangement of the radar device 1 without knowledge of the installation conditions has the disadvantage that the vehicle speed cannot be determined. For example, this precludes the possibility of detecting speeding violations of vehicles 3 and evaluating them as a function of the classification of the vehicles 3. However, the installation conditions can also be learned automatically by the radar device 1 in principle so that it is also capable of measuring the vehicle speed.

LIST OF REFERENCE NUMERALS 1 radar device
11 radar radiation
12 radar cone
13 axis of symmetry
2 roadway
3 vehicle
31 vehicle front
32 vehicle flank
33 point reflector
34 driving direction
4 measurement signal
BB assessment region
AB starting region
MB middle region
EB end region
t measurement time period
$t_B$ assessment time
SA signal amplitude
RE radial distance
hAA horizontal installation distance
vAH vertical installation height
$f_D$ Doppler frequency
VM comparison model
α horizontal installation angle
γ object angle
ε vehicle angle While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Method for classifying vehicles in which vehicles passing through a radar cone formed by radar radiation are measured, said vehicles having surfaces on which radar radiation impinges thus reflecting said radar radiation, and wherein measurement signals with frequencies corresponding to a Doppler shift are generated, said method comprising:

a) arranging, at a vertical installation height relative to a surface of a roadway and at a horizontal acute installation angle relative to an edge of the roadway, an angle-resolving radar device for yielding measurement signals which have frequencies corresponding to the Doppler shift and from which radial distances, object angles and radial velocities can be derived, b) emitting a radar beam from said radar device forming a radar cone, and acquiring measurement signals from at least one vehicle traveling through the radar cone at a plurality of measuring times during a measurement time period, c) storing the frequencies of the acquired measurement signals of measured vehicles as functions over the measurement time period, and forming a spectrogram for every measured vehicle, d) checking the spectrograms for assessment regions with maximum bandwidth of the frequency, and at least one measuring time is determined in the assessment region as an assessment time, e) comparing said assessment regions with assessment regions of stored spectrograms for different vehicle classes, and assigning the most similar spectrogram in order to classify the vehicles traveling through said cone, and f) deriving object angles from the measurement signals at the at least one assessment time within the assessment regions with maximum bandwidth, wherein the respective derived object angles for the respective assessment time are stored in each instance as a function over the frequency, and the curve of the function is compared with comparison models stored for different vehicle classes in order to verify the classification of vehicles.

2. Method according to claim 1, further comprising modeling of a size of the at least one vehicle from the comparison of all formed functions with stored comparison models.

3. Method according to claim 1, wherein a probability distribution is determined for different vehicle sizes when forming each function, and these probabilities are accumulated in a weighted manner over the entire time curve.

4. Method for classifying vehicles in which vehicles passing through a radar cone formed by radar radiation are measured, said vehicles having surfaces on which radar radiation impinges and reflects the radar radiation, and wherein measurement signals with frequencies corresponding to a Doppler shift are generated, said method comprising the following steps:

a) arranging, at a vertical installation height relative to a surface of a roadway and at a horizontal acute installation angle relative to an edge of the roadway, an angle-resolving radar device producing measurement signals which have frequencies corresponding to the Doppler shift and from which radial distances, object angles and radial velocities can be derived, b) emitting a radar beam from said radar device forming a radar cone, and acquiring measurement signals from at least one vehicle traveling through the radar cone at a plurality of measuring times during a measurement time period, c) storing the frequencies of the acquired measurement signals of measured vehicles as functions over the measurement time period, and forming a spectrogram for every measured vehicle, d) checking the spectrograms for assessment regions with maximum bandwidth of the frequency, and at least one measuring time is determined in the assessment region as an assessment time, e) comparing said assessment regions with assessment regions of stored spectrograms for different vehicle classes, and an assignment is made to the most similar spectrogram in order to classify the vehicles traveling through said cone, and f) deriving radial distances from the measurement signals at the at least one assessment time within the assessment regions with maximum bandwidth, wherein the respective derived radial distances for the respective assessment time are stored in each instance as a function over the frequency, and the curve of the functions is compared with comparison models stored for different vehicle classes in order to verify the classification of vehicles.

5. Method according to claim 4, further comprising modeling of a size of the at least one vehicle from the comparison of all formed functions with stored comparison models.

6. Method for classifying vehicles in which vehicles passing through a radar cone formed by radar radiation are measured, said vehicles having surfaces on which radar radiation impinges and reflects the radar radiation, and wherein measurement signals with frequencies corresponding to the Doppler shift are generated, said method comprising:

a) arranging, at a vertical installation height relative to a surface of a roadway and at a horizontal acute installation angle relative to an edge of the roadway, an angle-resolving radar device yielding measurement signals which have frequencies corresponding to the Doppler shift and from which radial distances, object angles and radial velocities can be derived, b) emitting a radar beam from said radar device forming a radar cone, and acquiring measurement signals from at least one vehicle traveling through the radar cone at a plurality of measuring times during a measurement time period, c) storing the frequencies of the acquired measurement signals of measured vehicles are stored as functions over the measurement time period, and forming a spectrogram for every measured vehicle, d) checking the spectrograms for assessment regions with maximum bandwidth of the frequency, and at least one measuring time is determined in the assessment region as an assessment time, e) comparing said assessment regions with assessment regions of stored spectrograms for different vehicle classes, and an assignment is made to the most similar spectrogram in order to classify the vehicles traveling through said cone, and f) deriving signal amplitudes of the measurement signals from the measurement signals at the at least one assessment time within the assessment regions with maximum bandwidth, wherein the signal amplitudes of the measurement signals for the respective assessment time are stored in each instance as a function over the frequency, and the curve of the functions is compared with comparison models stored for different vehicle classes in order to verify the classification of vehicles.

7. Method according to claim 6, further comprising modeling of a size of the at least one vehicle from the comparison of all formed functions with stored comparison models.

8. Method according to claim 6, wherein a probability distribution is determined for different vehicle sizes when forming each function, and these probabilities are accumulated in a weighted manner over the entire time curve.

* * * * *